United States Patent

[11] 3,595,558

| [72] | Inventors | Franklin G. Fisher;<br>Luther L. Bollinger, Sr., both of Reading, Pa. |
|---|---|---|
| [21] | Appl No. | 786,237 |
| [22] | Filed | Dec. 23, 1968 |
| [45] | Patented | July 27, 1971 |
| [73] | Assignee | Reading Company<br>Philadelphia, Pa. |

[54] POSITIONER FOR OBJECTS
6 Claims, 3 Drawing Figs.

[52] U.S. Cl............................................. 269/61, 269/71

[51] Int. Cl................................................ B23q 1/20, B23q 3/18

[50] Field of Search........................................ 269/25, 26, 55, 34, 58—62, 71—73, 238; 248/122, 124, 125, 13, 278; 228/49

[56] References Cited
UNITED STATES PATENTS

| 1,331,938 | 2/1920 | McConnell et al. | 269/61 X |
| 1,444,968 | 2/1923 | Gorsuch | 269/61 X |
| 2,679,684 | 6/1954 | Fagan | 269/65 |
| 2,899,197 | 8/1959 | Hilkemeier | 269/61 X |
| 3,039,766 | 6/1962 | Aronson | 269/61 |
| 3,110,279 | 11/1963 | Brashear | 269/58 |

*Primary Examiner*—Robert C. Riordon
*Attorney*—Jackson, Jackson & Chovanes

ABSTRACT: A positioner for objects such as car couplers undergoing repair welding which includes a vertically movable carriage, a longitudinal shaft and bearing supported on the carriage, the longitudinal bearing being adjustable angularly with respect to the carriage, a lateral bearing supported on the longitudinal bearing, a shaft journaled in the lateral bearing, the lateral bearing shaft being angularly adjustable with respect to the lateral bearing, and a clamp for the object mounted on the lateral bearing shaft. The clamp preferably includes scissors arms and a device to apply clamping pressure on the scissors arms. The scissors arms desirably are provided with pivoted jaws to engage the object. A safety bar extending from the lateral bearing shaft is desirably placed beneath the object.

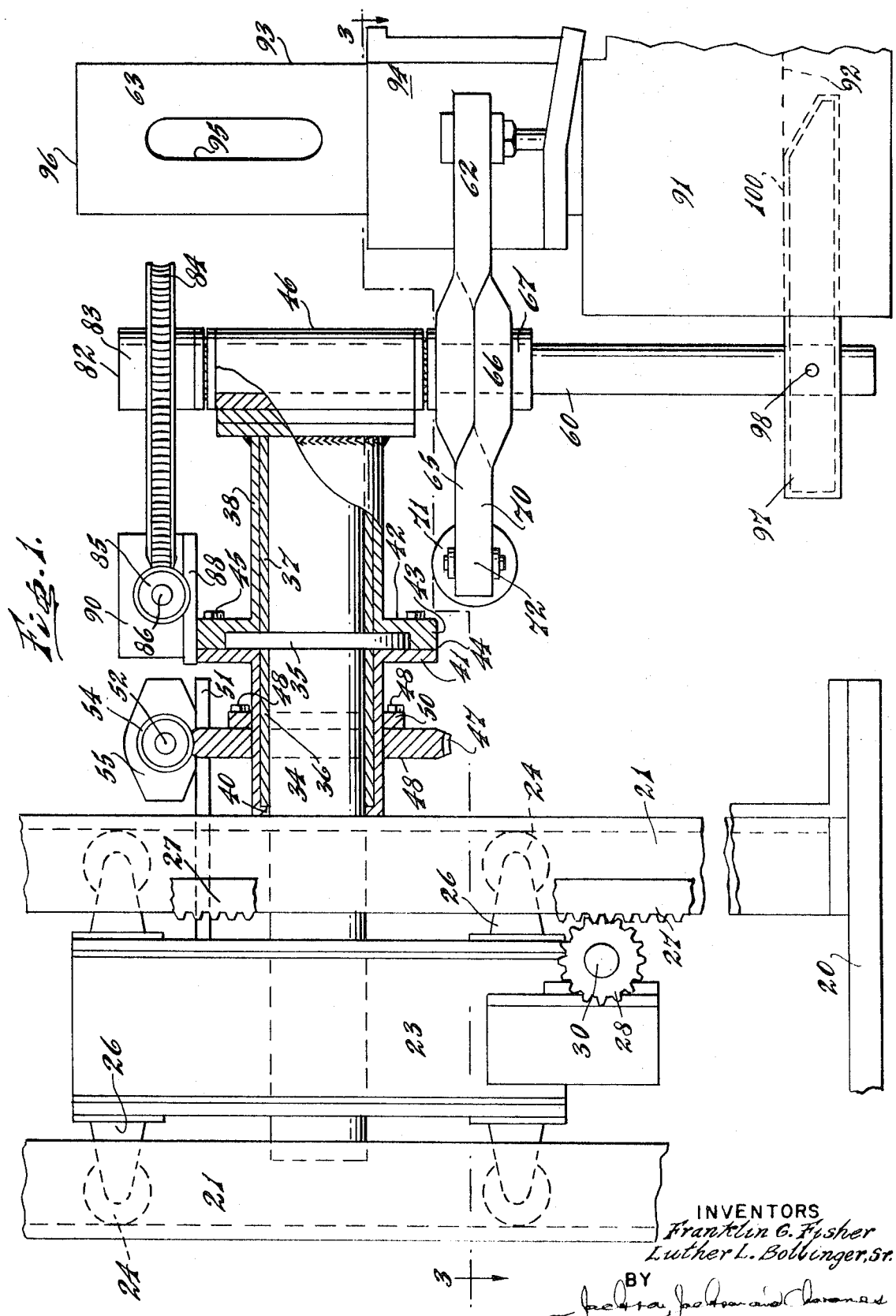

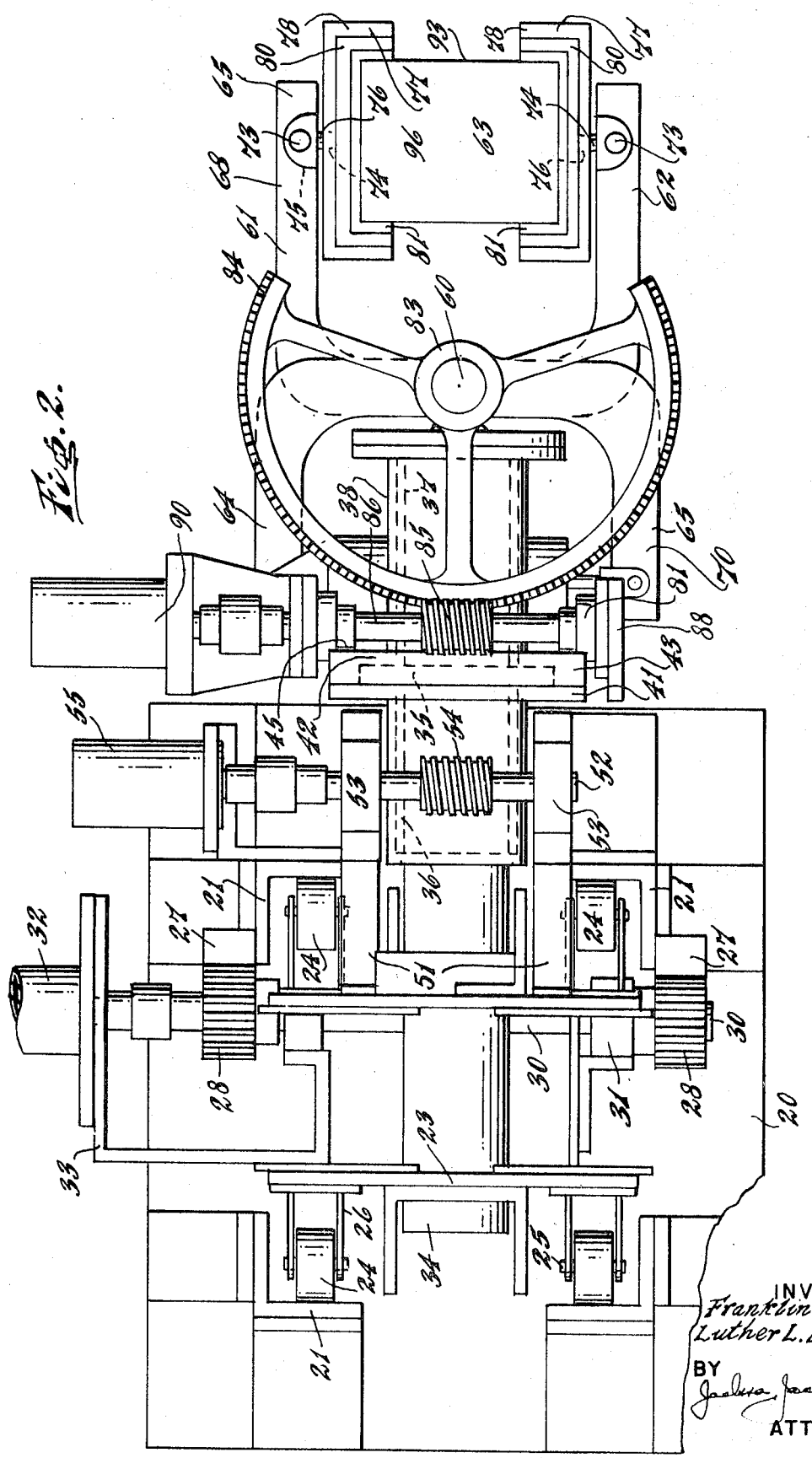

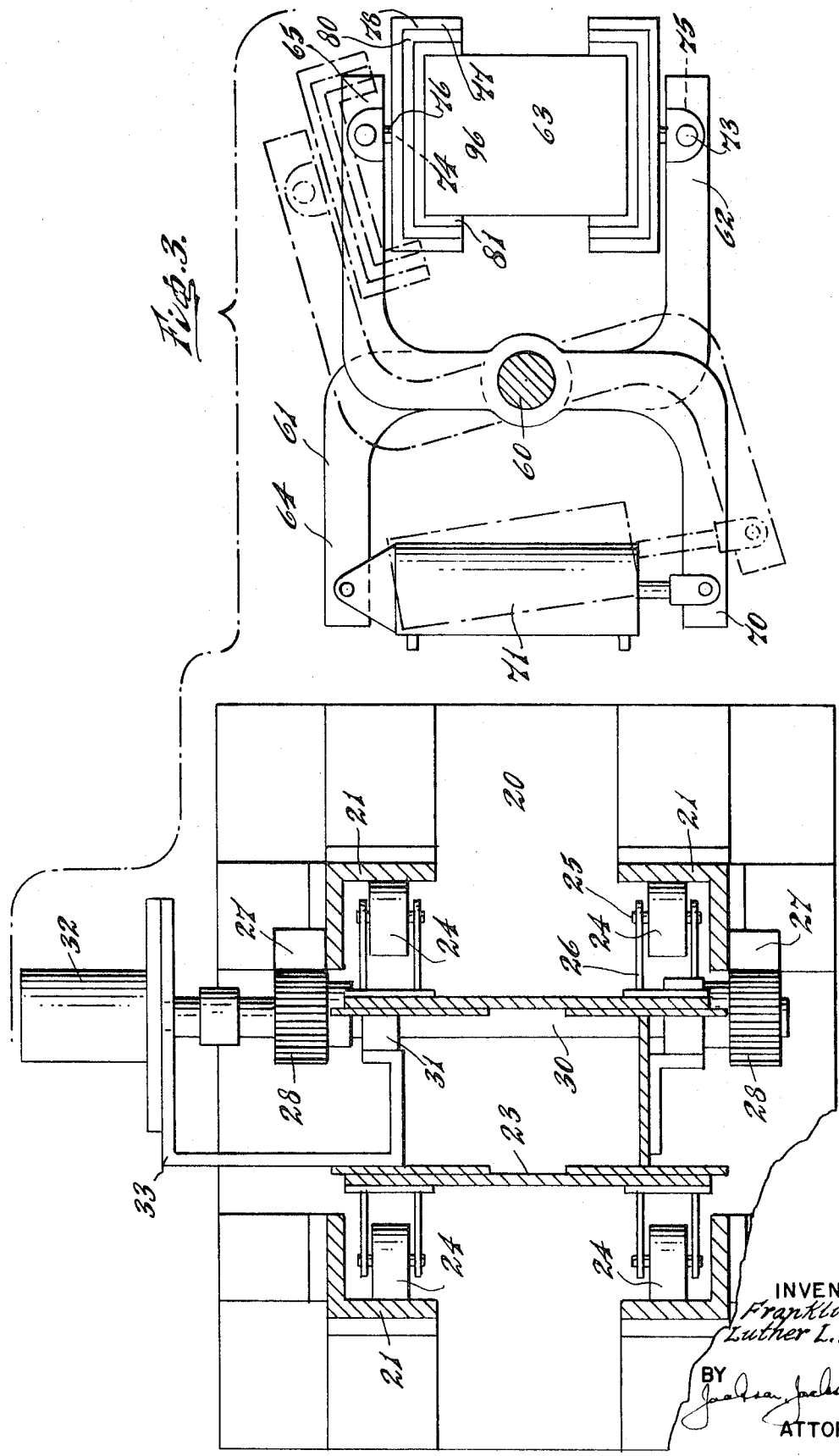

POSITIONER FOR OBJECTS

DISCLOSURE OF INVENTION

The present invention relates to positioners for objects, especially objects to undergo inspection and repair, and particularly car couplers.

A purpose of the invention is to support a car coupler from a vertically movable carriage which has, supported ultimately thereon, a clamp, and to make the clamp move to position either of its jaws higher or lower, and also make the clamp swing about an axis which may desirably be the axis of motion of the clamp jaws.

A further purpose is to employ scissors arms on the clamp, one of the arms being swingable with respect to the other, and the arms being subjected to clamping pressure.

A further purpose is to pivot the clamp jaws with respect to the clamp arms so that the jaws can properly engage an object for the purpose of lifting and holding it.

Further purposes appear in the specification and in the claims.

In the drawings I have chosen to illustrate one only of the numerous embodiments in which the invention may appear, selecting the form shown from the standpoints of convenience in illustration, satisfactory operation and clear demonstration of the principles involved.

FIG. 1 is a vertical section of the device of the invention, the section being taken on the line 1–1 of FIG. 2.

FIG. 2 is a top plan view of the device of the invention.

FIG. 3 is a plan section of FIG. 1 on the line 3–3.

Describing in illustration but not in limitation and referring to the drawings:

The present invention relates to a positioner for repair and inspection of objects, particularly bulky objects which are also heavy, such as couplings for railway cars. The device of the invention is especially suitable for welding fabrication and repair.

Kucka U.S. Pat. No. 3,239,209 shows a positioning table rotated by a worm and worm wheel in one direction and by a segment in the other direction.

Lindmark U.S. Pat. No. 3,159,129; Bergantini U.S. Pat. No. 3,260,438; Linnander U.S. Pat. No. 3,291,360 and Sykes U.S. Pat. No. 2,179,803 relate to positioners for components of beams.

The positioner of the present invention comprises a base 20 which supports a plurality of spaced vertical columns 21, conveniently in the form of angles, and disposed at the corners of a square. The columns are cross-connected at the top by a headplate (not shown).

A carriage 23 is located between the columns and carries rollers 24 at the top and bottom of the carriage which turn on pivots 25 mounted on brackets 26 on the carriage, the rollers riding the insides of the flanges of the columns so as to restrain the carriage laterally against motion in any direction.

On the outsides of two of the columns 21 at positions in line with one another there are secured vertically extending racks 27 which are engaged by gears 28 on a horizontal shaft 30 journaled in bearings 31 driven by a hydraulic motor 32 supported on the carriage 23 by a bracket 33. The hydraulic motor is driven by hydraulic fluid supplied through flexible connections from a suitable source at elevated pressure.

There is a horizontally extending longitudinal stub shaft or stationary shaft 34 fastened to the carriage and extending out beyond it cantilever fashion through the space between two columns. A stationary collar 35 is mounted on the shaft 34 beyond the space between the columns. Sleeve bearings 36 and 37 are secured on the shaft on opposite sides of the collar and a journal housing 38 is rotatable on the sleeve bearings with respect to the shaft. The housing 38 has a flange 40 which extends endwise of the sleeve bearing 36 into engagement with the shaft and includes outwardly extending flanges 41 and 42 on either side of the stationary collar 35 and a cross-connecting portion 43 radially outside the collar and permitting separation of the casing at 44 to aid in assembly and joining of the parts of the casing by bolts 45, thus forming a thrust bearing.

At its end remote from the columns the housing 38 supports a lateral bearing 46. In the position shown the bearing 46 is vertical but in any case it extends laterally with respect to the axis of longitudinal bearings 36 and 37.

Housing 38 has fastened thereon a worm wheel 47 secured as by bolts 48 to a collar 50 welded to housing 38. A shaft 52 extends across the housing in line with the worm wheel, and is journaled on bearings 53 on brackets 51 mounted on the carriage. A worm 54 on the shaft 52 meshes with worm wheel 47 and is driven by hydraulic drive motor 55 mounted to the brackets 51 and receiving hydraulic fluid pressure through flexible connections. Thus the hydraulic motor 55 is capable of rotating the housing and thus skewing bearing 46 to an angle offset with respect to the vertical in either direction.

A lateral bearing shaft 60 journals in lateral bearing 46. One scissors clamp arm 61 is fixed to the shaft 60 and is provided with one leg 62 which is adjoining the object 63 which is being positioned and an opposite leg 64 on which the clamping force is applied. An opposite scissors clamping arm 65 pivots on the shaft 60 at 66 and is positioned with respect to longitudinal motion on the shaft by a collar 67. The scissors arm 65 has a leg 68 adjoining the object to be positioned and an opposite leg 70 to which the clamping force is to be applied. A cylinder 71 is pivotally connected to one of the scissor arms and its piston and rod combination 72 is pivotally connected to the opposite scissors arm to apply clamping pressure. A source of hydraulic fluid is connected to the cylinder 71 through flexible connections. The legs 62 and 68 of the scissors clamping arms adjoining the object to be positioned carry cross pivots 73 which pivotally mount jaw pins 74 so that they can rock slightly about the pivots 73 in pivotal recesses 75. The jaw pins at their outer ends are pivotally mounted at 76 in jaws 77 adapted to fit the contour of the object. Each of the jaws 77 has a body 78, secured to a suitably metallic jaw plate 80 which is lined with an insulating lining 81 to prevent electrical grounding through the positioner in case welding is being carried on. The insulation may be nylon, rubber or synthetic rubber as desired.

The lateral bearing shaft 60 has at the top a reduced portion 82 which has secured thereon by keying and attaching with a nut 83 a gear or segment 84 to rotate the shaft 60. The segment 84 is of worm wheel form and meshes with a worm 85 on a wormshaft 86 journaled in bearings 87, mounted on brackets 88, on the housing 38. The brackets 88 also support a hydraulic motor 90 which drives wormshaft 86, the motor being supplied with hydraulic liquid through suitable flexible connections.

The object being positioned, which in this case may be a railway car coupler, has a coupler head 91, having a jaw opening 92 and a shank 93 connected by an intermediate portion 94 which is gripped by the scissors clamping jaws. There is a slot 95 which can be built up by welding if worn, and an end portion 96 which can be repaired as by welding a plate on the end, or the head 91 may be repaired by welding as required.

To guard against accident, the shaft 60 supports a safety bar 97 which has an opening through which the shaft passes and which is held in position by a pin 98. The safety bar is covered with an electrically insulating layer 100 to prevent grounding the coupler through the positioner.

In operation of the device of the invention the carriage 23 is raised to the desired level for receiving a new coupler by operating hydraulic motor 32 to raise or lower the carriage. The lateral bearing shaft 60 is brought to the proper position to receive the coupler, usually the vertical position, by operating hydraulic motor 55 to turn the housing 38 as required. The jaws are located correctly to receive the new coupler by operating hydraulic motor 90 to turn lateral bearing shaft 60. Hydraulic pressure is applied to the retracting end of hydraulic cylinder 71 to move the jaws apart and then the coupler is moved into place between the jaws by a crane, car or otherwise. The jaws are turned to the correct aspect to grip the coupler and then the hydraulic cylinder 71 is energized to move the jaws into gripping position engaging the coupler. Depending on where the coupler must be located for convenient work, with the crane or car out of the way, the positioner is manipulated so that convenient access to the coupler can be gained to work on it. This may require raising the carriage, turning the casing 38, and turning the lateral bearing shaft 60. When the initial jaws engage, the safety bar 97 correctly gripped in the jaw opening of the coupler prevents the coupler from slipping out of the scissors clamping jaws.

Since the parts of the positioner which engage the coupler are electrically insulated, any welding current is not grounded through the positioner, and of course a separate grounding clamp is connected to the coupler as required.

It will be evident that the positioner of the invention is able to raise and lower the coupler or other object and to swing it to any required angle for work on the coupler.

It will be evident that the configuration of the jaws will be adjusted to conform to the desired shape of the work.

In view of our invention and disclosure, variations and modifications to meet individual whim or particular need will doubtless become evident to others skilled in the art to obtain all or part of the benefits of our invention without copying the structure shown and we, therefore, claim all such insofar as they fall within the reasonable spirit and scope of our claims.

Having thus described our invention what we claim as new and desire to secure by Letters Patent is:

1. In a positioner for objects, column means providing support, a carriage cooperating with the column means, guide means between the carriage and the column means for guiding the carriage in up-and-down motion, means for raising and lowering the carriage, a lateral bearing, bearing and shaft means supporting the lateral bearing from the carriage and permitting tilting of the lateral bearing with respect to the carriage, means for shifting the angle of tilt of the lateral bearing, a lateral bearing shaft journaling in the lateral bearing, means for shifting the angle of the lateral bearing shaft with respect to the lateral bearing, and clamp means mounted on the lateral bearing shaft, in which the clamp means comprises scissors arms, and means for applying clamping pressure to the scissors arms.

2. A positioner of claim 1, in which at least one of the scissors arms is pivoted on the lateral bearing shaft, jaws pivoted on the scissors arms, and means for applying clamping pressure to the scissors arms and through them to the jaws.

3. In a positioner for objects, a base, columns mounted on the base, a carriage cooperating with the columns, guide means between the carriage and the columns for guiding the carriage in up-and-down motion, means for raising and lowering the carriage, a longitudinal shaft mounted on and extending from the carriage, bearing means including journal and thrust bearings on the longitudinal shaft, means acting from the carriage to rotate the bearing means about the longitudinal shaft, a lateral bearing on the bearing means extending transversely to the axis of the longitudinal shaft, a lateral bearing shaft journaled in the lateral bearing, means acting from said bearing means for rotating the lateral bearing shaft with respect to the lateral bearing, and clamp means mounted on the lateral bearing shaft.

4. A positioner of claim 3, in which the clamp means comprises scissor arms, and means for applying clamping pressure to the scissor arms.

5. A positioner of claim 3, in which the clamp means comprises scissor arms at least one of which is pivoted on the lateral bearing shaft, jaws pivoted on the scissor arms, and means for applying clamping pressure to the scissor arms and through them to the jaws.

6. A positioner of claim 3, in combination with a safety bar on the lateral shaft extending under the object.